(12) United States Patent
Gächter et al.

(10) Patent No.: US 8,550,536 B2
(45) Date of Patent: Oct. 8, 2013

(54) TAILGATE FROM FIBRE-REINFORCED THERMOPLASTIC PLASTIC

(75) Inventors: Matthias Gächter, Zürich (CH); Diego Jaggi, Zürich (CH); Andreas Rüegg, Zürich (CH); Stefan Ziegler, Zürich (CH); Norbert Stötzner, Markdorf (DE)

(73) Assignee: Weber Automotive AG-Holding, Kusnacht (CH)

( * ) Notice: Subject to any disclaimer, the term of this patent is extended or adjusted under 35 U.S.C. 154(b) by 0 days.

(21) Appl. No.: 13/511,171

(22) PCT Filed: Nov. 22, 2010

(86) PCT No.: PCT/CH2010/000293
§ 371 (c)(1),
(2), (4) Date: Jul. 27, 2012

(87) PCT Pub. No.: WO2011/063538
PCT Pub. Date: Jun. 3, 2011

(65) Prior Publication Data
US 2012/0280533 A1    Nov. 8, 2012

(30) Foreign Application Priority Data
Nov. 25, 2009   (CH) ...................................... 1811/09

(51) Int. Cl.
*B60J 5/10*   (2006.01)
(52) U.S. Cl.
USPC ......................................... 296/146.8; 296/56
(58) Field of Classification Search
USPC ................................ 296/50, 51, 56, 76, 146.8
See application file for complete search history.

(56) References Cited

U.S. PATENT DOCUMENTS

| 6,508,035 | B1* | 1/2003 | Seksaria et al. | 49/502 |
| 7,347,476 | B2* | 3/2008 | Luehr et al. | 296/61 |
| 2003/0207116 | A1 | 11/2003 | Franken et al. | |
| 2005/0202223 | A1 | 9/2005 | Harima et al. | |
| 2005/0266224 | A1 | 12/2005 | Husler et al. | |

FOREIGN PATENT DOCUMENTS

| DE | 10392573 | 8/2005 |
| EP | 1359005 | 11/2003 |
| EP | 1498295 | 1/2005 |
| WO | 2004024426 | 3/2004 |

* cited by examiner

*Primary Examiner* — Joseph Pape
(74) *Attorney, Agent, or Firm* — Rankin, Hill & Clark LLP

(57) ABSTRACT

The tailgate (1) or rear door for a motor vehicle with a rear window includes a single-piece main carrying structure (10) with a peripheral, flexurally resistant frame (11), with an upper transverse beam (12), two lateral longitudinal beams (13, 14) and at least one lower transverse beam (15). The main carrying structure consists of a fibre-reinforced moulding compound (20) with at least two impregnated, integrated continuous-fibre bands (21) and this moulding compound is non-positively connected to the rear window (2) and together with this forms a flexurally resistant structure. Thereby, the continuous-fibre bands (21) in sections are integrated into the frame (11) in an arrangement vertical (v) to the surface (H) of the tailgate, by way of the continuous-fibre bands (21) being arranged vertically to the surface (H) and/or at a vertical distance (d) to the surface (H).

15 Claims, 4 Drawing Sheets

TAILGATE FROM FIBRE-REINFORCED THERMOPLASTIC PLASTIC

BACKGROUND OF THE INVENTION

1. Field of the Invention

The invention relates to a tailgate or rear door for a motor vehicle with a carrying structure of a fibre-reinforced thermoplastic plastic with hinges, a lock and a rear window.

2. Description of Related Art

For some time, one has attempted to replace the existing metal tailgates with lighter plastic designs for the purpose of weight reduction. For example, a double-walled plastic component is known from EP 0 266 514, which however is still expensive in manufacture and above all has inadequate mechanical characteristics. In order to achieve improved mechanical characteristics, various tailgates with a GMT-structure and subsequently also with GMTex, i.e. GMT with fabric reinforcement, have been applied. Since these also still have insufficient mechanical characteristics, further carrying structures of fibre-reinforced plastics with metallic frame designs have been combined into a main carrying structure with sufficient mechanical characteristics. Such a motor vehicle rear door with a metal frame is known e.g. from EP 1 621 384. These known tailgates, however, also have an increased weight, on account of metal reinforcement, and they entail a more costly manufacture. The known tailgates thus on the one hand require a costly manufacture, and without metal reinforcements have inadequate strength and stiffness characteristics or with the metal reinforcement are more costly to manufacture and also heavier.

BRIEF SUMMARY OF THE INVENTION

It is the object of the present invention to overcome the disadvantages of the known tailgates, and to provide a lighter, stiffer, simply and inexpensively manufacturable plastic tailgate which also permits the most varied of shapes. In particular, a fibre-reinforced main carrying structure is to be created without additional metal reinforcements.

The single-piece main carrying structure with a peripheral, flexurally resistant frame with integrated continuous-fibre bands in a vertical alignment to the surface of the tailgate, in combination with the non-positively connected rear window and with bead-like stiffenings of the fibre-reinforced moulding compound of the frame, results in improved mechanical characteristics with regard to stiffness and strength, a significantly reduced weight, and a reduced, simplified manufacturing effort.

BRIEF DESCRIPTION OF THE DRAWINGS

The dependent patent claims relate to advantageous further formations of the invention with particular advantages with respect to weight reduction, improved mechanical characteristics and a simplified rational production. The invention is hereinafter explained in more detail by way of embodiment examples and figures, where are shown in:

FIG. 5—with a vertical continuous-fibre band in a bead;

FIG. 6—with a horizontal continuous-fibre band at a vertical distance to the surface;

FIG. 7—with an upper and with a lower horizontal continuous-fibre band;

FIG. 8—with a vertical and a lower horizontal continuous-fibre band;

DETAILED DESCRIPTION OF THE INVENTION

Figure 1:
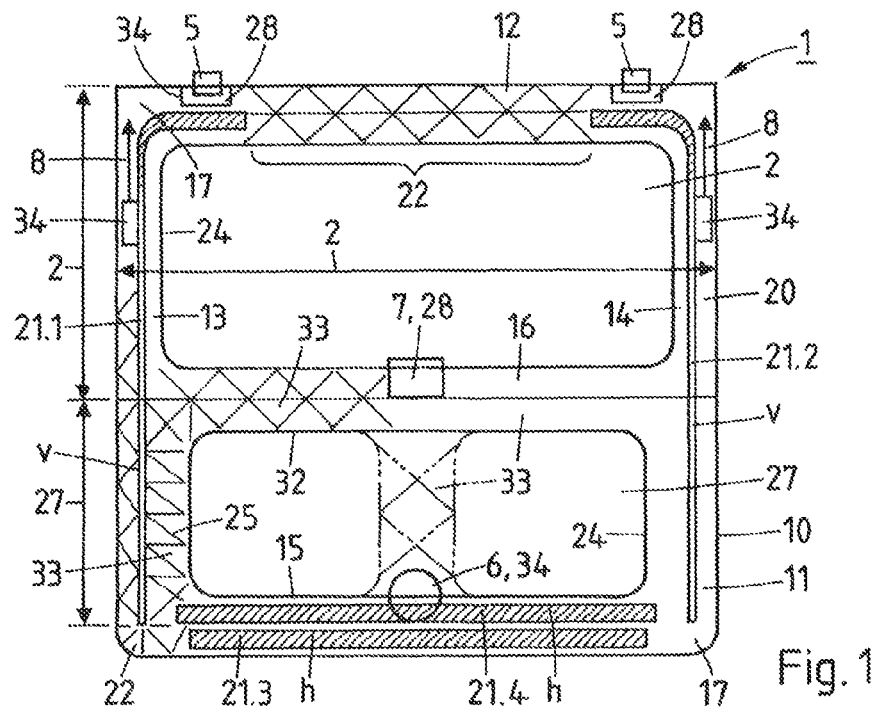
FIG. 1, 2 examples of tailgates according to the invention, with a main carrying structure of fibre-reinforced thermoplastic plastic with a peripheral frame with integrated continuous-fibre bands, in a vertical arrangement.
Figure 2:
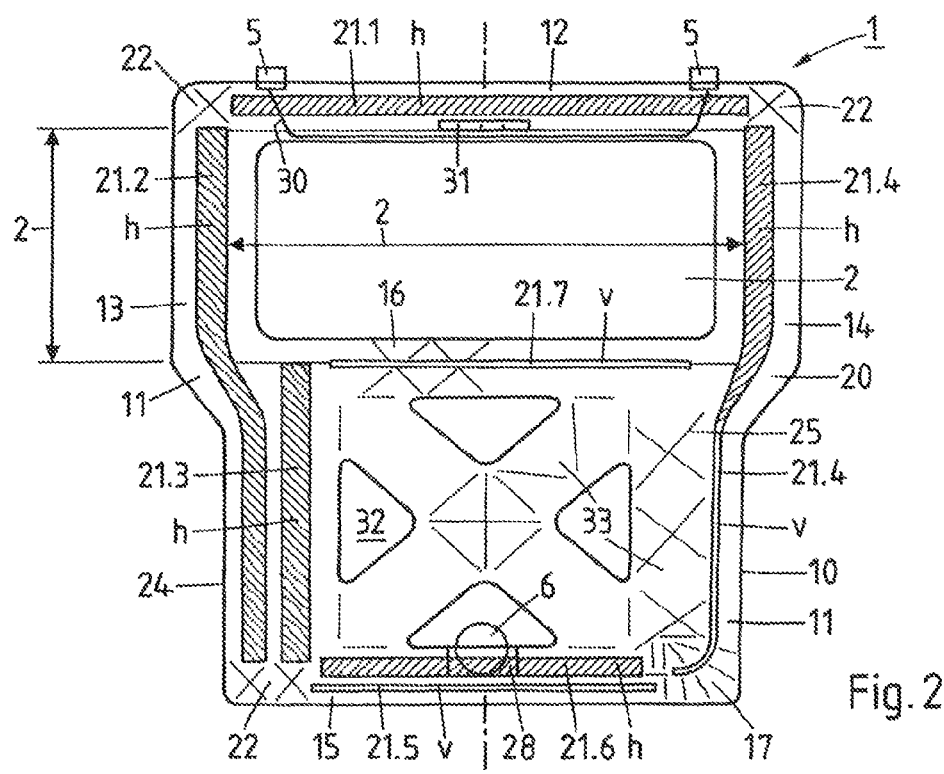

FIGS. 1 and 2 show examples of a tailgate 1 or rear door, according to the invention, for a motor vehicle, with a structure of fibre-reinforced thermoplastic plastic and with hinges 5, a lock 6 and a rear window 2. The tailgate comprises a single-piece main carrying structure 10 with a peripheral, flexurally resistant frame 11, with an upper transverse beam 12, two lateral longitudinal beams 13, 14 and at least one lower transverse beam 15. The main carrying structure consists of a fibre-reinforced moulding compound 20 with at least two impregnated, integrated continuous-fibre bands 21 and which is connected to the rear window 2 with a non-positive fit and together with this forms a flexurally resistant structure. Thereby, the continuous-fibre bands 21 in sections are integrated into the frame 11 in an arrangement vertical (v) to the surface H of the tailgate, by way of the continuous-fibre bands 21 being arranged vertically to the surface H and/or at a vertical distance d to the surface H (see FIG. 3). The continuous-fibre bands are connected to one another by way of spatial spacings of the fibre-reinforced moulding compound 20 as force-transmitting and stiffening connection regions 22, and the frame 11 comprises bead-like stiffenings 24 of the moulding compound 20 or is designed in a bead-like manner. With this, a tailgate with a reduced weight, improved mechanical characteristics and a simplified manufacture is created. Preferably, the bead-like frame 11 can additionally also comprise rib-like stiffenings 25.

Figure 3:
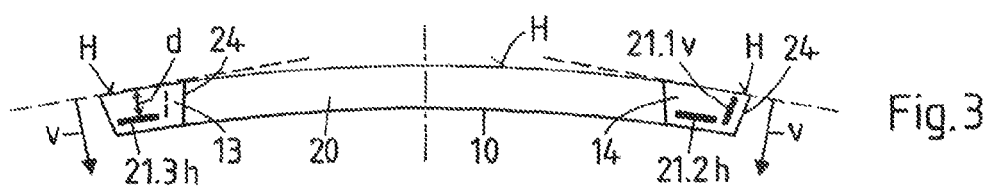
FIG. 3 vertical arrangements of continuous-fibre bands with respect to the surface of the tailgate.

FIG. 3 in section shows vertical arrangements of the integrated continuous-fibre bands 21 in a bead 24 of the frame 11 with respect to the outer surface H of the tailgate:
- at a vertical distance d to the surface H (i.e. to the tangential plane to the surface)
- and/or with a vertical alignment to the surface H. In FIG. 3, the horizontal (h) continuous-fibre bands 21.2 and 21.3 have a distance d to the surface H and a vertical (v) continuous-fibre band 21.1 has an extension in the vertical direction to H.

Figure 7:
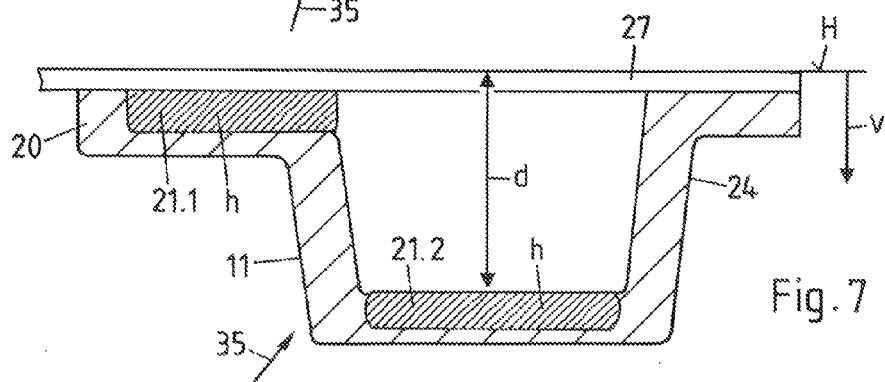

The examples of FIGS. 1 and 2 have the following vertical arrangements of the continuous-fibre bands in the frame 11:

FIG. 1 shows two vertical (v) continuous-fibre bands 21.1 and 21.2 in the lateral longitudinal beams 13 and 14 (see FIG. 5), and in the lower transverse beam 15 a lower horizontal (h) continuous-fibre band 21.3 at a distance d to the surface and an upper horizontal continuous-fibre band 21.4 at the surface H (see FIG. 7).

FIG. 2 shows two different variants of possible arrangements in the lateral longitudinal beams:

In the variant on the left, in the longitudinal beam 13: a lower horizontal (h) continuous-fibre band 21.2 at a distance d to the surface H in the region of the rear window 2 and in the region below the rear window an additional second horizontal (h) continuous-fibre band 21.3 on the surface H.

In the variant on the right, in the longitudinal beam 14 in the region of the rear window: a continuous-fibre band 21.4 which here runs horizontally (h) at a distance d to the surface H and which is rotated into the vertical direction (v) for the region below the rear window.

Figure 8:
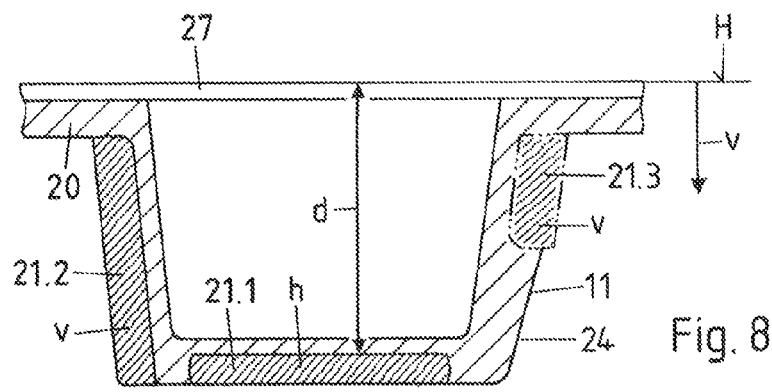

Both variants in the upper transverse beam 12 have a horizontal (h) continuous-fibre band 21.1 and in the lower transverse beam 15 a horizontal (h) continuous-fibre band 21.6 at a distance d to the surface H and a vertical (v) continuous-fibre band 21.5 (see FIG. 8).

Advantageously, the continuous-fibre bands 21 can also be bent over in the corners 17 of the frame 11 and e.g. be bent from a longitudinal beam into a transverse beam, as in FIG. 1 the continuous-fibre bands 21.1, 21.2 are bent from the longitudinal beams 13, 14 into the upper transverse beam 12 up to the hinges 5. The continuous-fibre band 21.4 at the corner 17 is bent into the lower transverse beam 15, in FIG. 2 on the right.

The connection regions 22, with which the continuous-fibre bands are connected to one another in a force-transmitting and stiffening manner by way of spatial projections (e.g. bead-like or rib-like) of the fibre-reinforced moulding compound 20 are also very important, e.g. in the corners 17 of the frame 11 and in FIG. 1, in the upper transverse beam 12 between the continuous-fibre bands 21.1 and 21.2.

Depending on the shape and size of the tailgate or rear door, preferably the frame 11 and also regions 33 within the frame 11 are formed with bead-like 24 and rib-like 25 stiffenings. Thus FIGS. 1 and 2 have an additionally profiled bead-like transverse beam 16 on the lower edge of the rear window 2, here with a holder 28 for a wiper motor 7. This transverse beam 16 can also comprise an additional continuous-fibre band 21.7 (FIG. 2). The main carrying structure mostly also comprises openings 32, as FIGS. 1 and 2 show, which are covered with outer coverings 27 on the main carrying structure 10. The continuous-fibre bands 21 are preferably designed such that they extend up to the load accommodation locations 34, so that acting forces can be accommodated directly by the continuous-fibre bands: in FIG. 1, at load accommodation locations 34 from the spring damping elements 8 and from the hinges 5 by the continuous-fibre bands 21.1 and 21.2 and from the lock 6 by the continuous-fibre bands 21.3 and 21.4. Thereby, inserts 28 for fastening the lock 6, hinges 5, spring damping elements 8 and the wiper motor 7, as load accommodation locations 34, can simply be integrated into the main carrying structure 10 for accommodating engaging forces.

Figure 4:
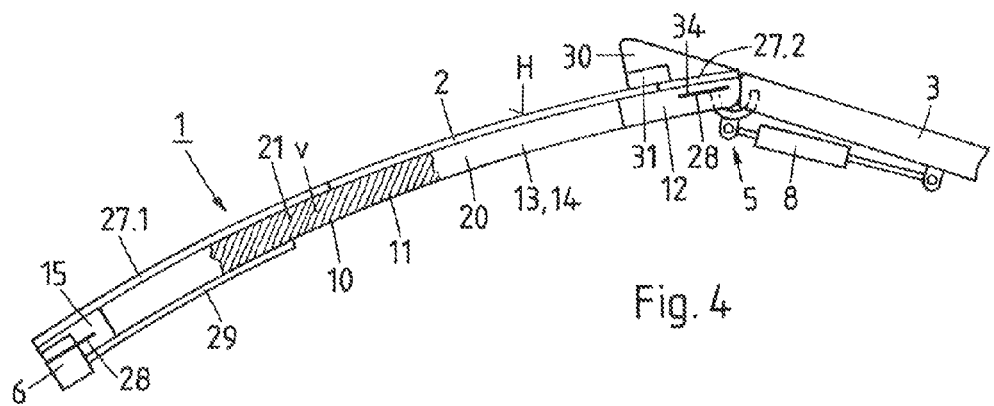
FIG. 4 a vertical section through a tailgate according to the invention.

FIG. 4 schematically shows a vertical section through a tailgate (similar to FIG. 1) with vertical (v) continuous-fibre bands 21 in the longitudinal beams 13, 14. The main carrying structure 10 here as an outer skin or bodywork surface, in a region next to the rear window 2 additionally comprises light plastic outer coverings 27 which are fixed or preferably bonded on the main carrying structure 10, as well as are painted or coloured. Such outer coverings can be attached below (27.1), above (27.2) or laterally next to the rear window. A plastic rear spoiler 30 as an outer covering can also be fixed or bonded on the main carrying structure 10. The main carrying structure 10 with the bead-like, peripheral, flexurally resistant frame 11 can preferably be covered on the outer viewed surface (H) outside—above all below—the rear window 2 by way of a plastic layer as an outer covering 27 which is connected to the main carrying structure 10 with a non-positive fit and thus can additionally increase the bending or torsional stiffness of the tailgate. In the example of FIG. 4, a rear spoiler 30 is arranged above the rear window, wherein with this, additional components 31 such as a third braking light, an antenna or a reverse drive camera can be built in. An additional inner covering 29 as an inner trim (i.e. a felt layer or a light plastic layer) can also be attached on the inner side of the main carrying structure 10 in part regions. At locations, this inner covering 29 can also consist of fibre-reinforced plastic (with or without continuous-fibres) and be connected to the main carrying structure with a non-positive fit and thus form an additional stiffening. Spring damping elements 8 here are supported on the hinges 5 with holders 28 and on the chassis 3.

Figure 5:
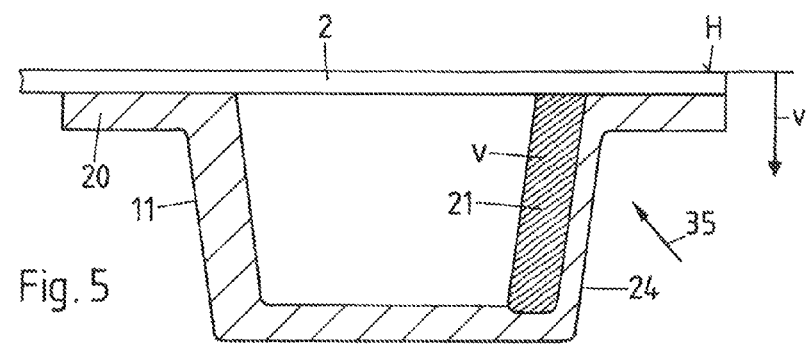
FIG. 5-8 in section, arrangements of continuous-fibre bands in the frame of the main carrying structure.
Figure 6:
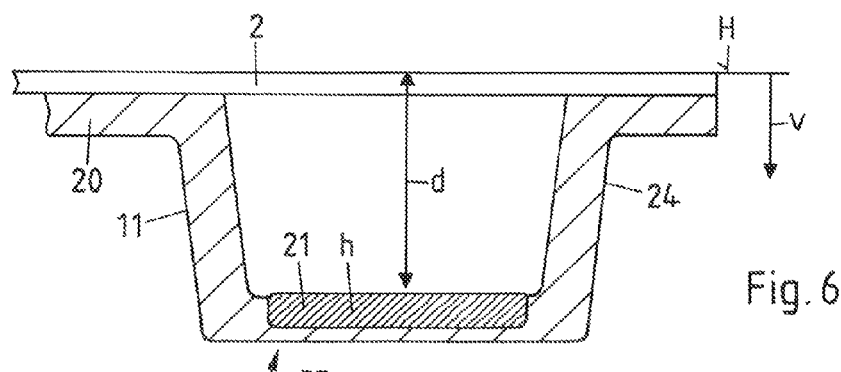

FIGS. 5-8 in cross section illustrate different arrangements of continuous-fibre bands 21 in a bead 24 of the frame 11 with an arrangement in the vertical direction (v) to the surface H of the tailgate. The impregnated continuous-fibre bands 21 are integrated into the moulding compound 20. The continuous-fibre bands are preferably covered by the moulding compound 20, in regions where the main carrying structure forms an inner viewed surface 35 (and is not covered by an inner trim), so that the viewed surface 35 is formed by the moulding compound 20, as FIGS. 5-7 show.

FIG. 5 shows an integrated vertical (v) continuous-fibre band 21 in a trough or bead 24 of fibre-reinforced moulding compound 20. This can additionally comprise a ribbing 25 as e.g. is shown in FIG. 10, and e.g. form longitudinal beams 13, 14.

FIG. 6 shows a bead with an integrated horizontal (h) continuous-fibre band 21 at a vertical distance d to the surface H, and this bead which here is formed by the rear window 2 which is non-positively bonded on, and in combination with this forms a flexurally resistant frame 11.

FIG. 7 shows an example of a frame 11 with a horizontal (h) continuous-fibre band 21.1 on the surface H and with a horizontal continuous-fibre band 21.2 at a vertical distance d to the surface in a bead 24. The structure, as also that of FIGS. 5 and 8, alone, also without the rear window, forms a flexurally resistant frame structure 11. An additional, bonded-on light plastic layer as an outer cover 27 can act in an additionally reinforcing manner, above all in the region below the rear window.

FIG. 8 shows a bead 24 with a lower horizontal continuous-fibre band 21.1 at a distance d to the surface H and with a vertical continuous-fibre band 21.2 which here lie (visibly) on the inner surface. As a further variant, a thicker vertical continuous-fibre band 21.3 further up towards the surface H can be combined with the continuous-fibre band 21.1 together into a flexurally resistant structure.

Figure 9:
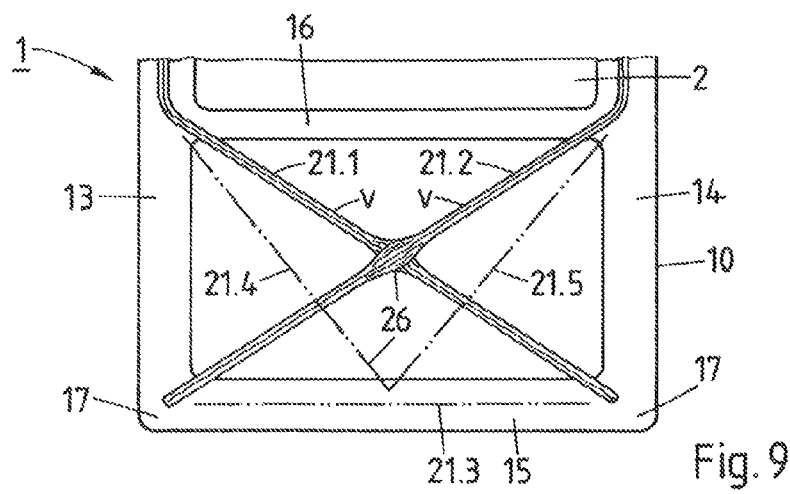
FIG. 9 a main carrying structure with a diagonal or cross-shaped arrangement of continuous-fibre bands.

FIG. 9 shows further variants of flexurally resistant main carrying structures 10 with cross-like, i.e. crossing, vertically arranged continuous-fibre bands 21.1 and 21.2 or with diagonal (26) continuous-fibre bands 21.4 and 21.5 as well as 21.3 in the region below the rear window 2, and these extend to the lower corners 17 of the main carrying structure 10. Vertical continuous-fibre bands 21.1, 21.2 can be deformed locally in each case by half the height (d/2) at the crossing location 26, in order to be able to cross within a given height (d). Or the crossing location could be formed by an upper and a lower horizontal continuous-fibre band, as well as a crossing vertical continuous-fibre band which lies therebetween.

Figure 10A:
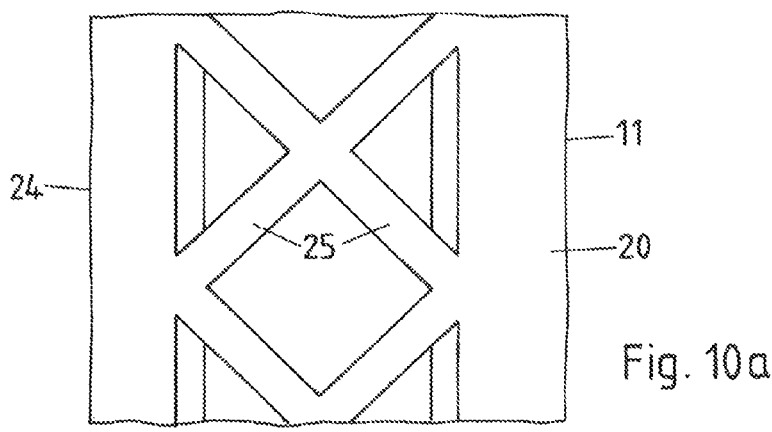
FIG. 10a, 10b, 10c a bead-like or trough-like beam with a diagonal ribbing.
Figure 10B:
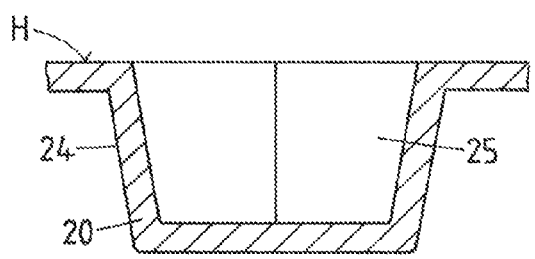
Figure 10C:
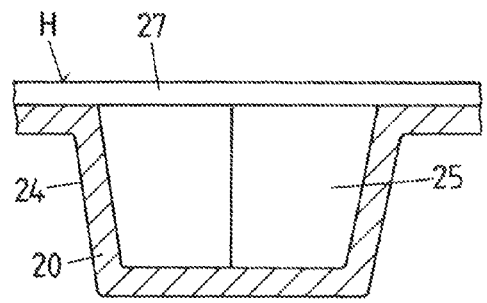

FIGS. 10a, 10b in two views, show a carrying structure or a longitudinal beam or transverse beam which are preferably designed as a trough or bead 24 with a diagonal or cross-like ribbing 25. All integrated continuous-fibre bands 21 are integrated into beadlike and/or rib-like structures of the fibre-reinforced moulding compound 20. FIG. 10c additionally shows a non-positively connected cover layer 27, with which a closed, torsionally stiff profile is formed, e.g. as an upper transverse beam 12 in FIG. 1.

Figure 11A:
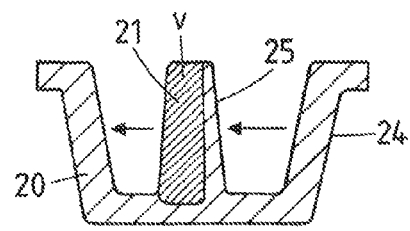
FIG. 11a, b a vertical continuous-fibre band, in a rib.
Figure 11B:
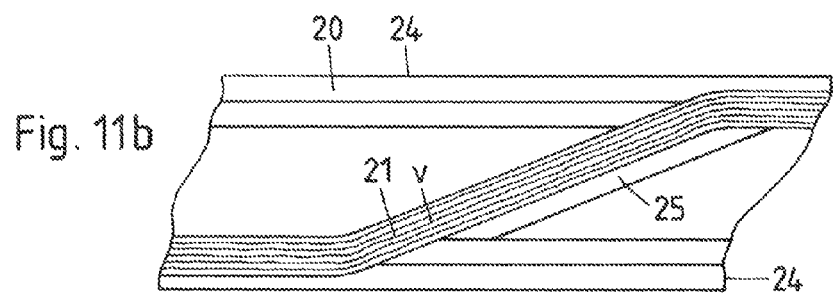

FIGS. 11a, b in two views show an example with a vertical continuous-fibre band 21 in a rib 25 which merges from a bead wall 24 in a continuous manner into the oppositely lying bead wall.

Lighter, simply constructed main carrying structures 10 and thus tailgates 1 or rear doors can be created with the construction, according to the invention, of the main carrying structure 10 of fibre-reinforced moulding compound 20 which permits any desired shapes, and with integrated continuous-fibre bands 21 which are arranged and shaped optimally according to the mechanical load demands. This is also accomplished with improved mechanical characteristics and a rational, inexpensive manufacture. Moreover, an extensive shaping freedom for tailgates or rear doors of the most varied of types is made possible, e.g. also rear doors with laterally arranged lock and hinges. For this, also the integrated continuous-fibre bands 21 can preferably be bent and profiled accordingly.

Preferably, the main carrying structure 10 can be manufactured with an extrusion pressing method or with an injection moulding method with shaped or shape-stabilised continuous-fibre bands or continuous-fibre profiles, which are inserted into a tool mould. Such an advantageous manufacturing method is e.g. specified in WO 2004/024426. The impregnated continuous-fibre bands or profiles preferably consist of UD (unidirectional) continuous-fibres in a polymer matrix (e.g. continuous glass fibres in polypropylene PP) and the fibre-reinforced moulding compound 20 preferably has an average fibre length of at least 2 mm (although shorter fibres could also be used). Depending on the demand, one can achieve even better mechanical characteristics with fibre lengths of 5-10 mm and more (long-fibre-reinforcement). Of course also other polymers and reinforcement fibres can be applied (e.g. polyamide PA and carbon fibres).

Figure 12:
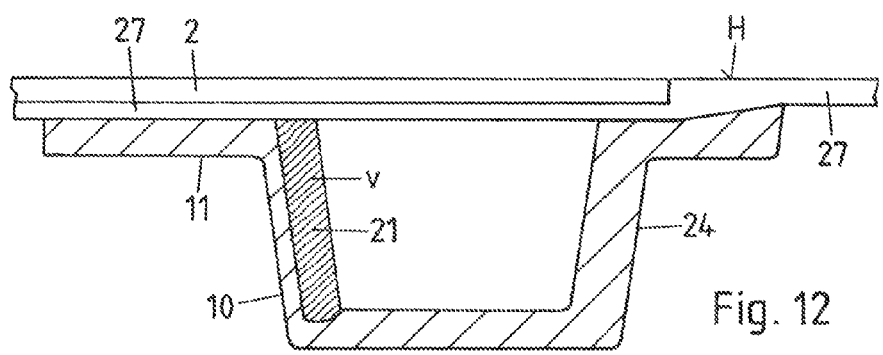
FIG. 12 a plastic outer covering which is connected to the main carrying structure and the rear window.

FIG. 12 as a further variant comprises a frame 11, onto which in a part region, a plastic outer trim 27 and thereabove the rear window 2 is bonded.

Figure 13:
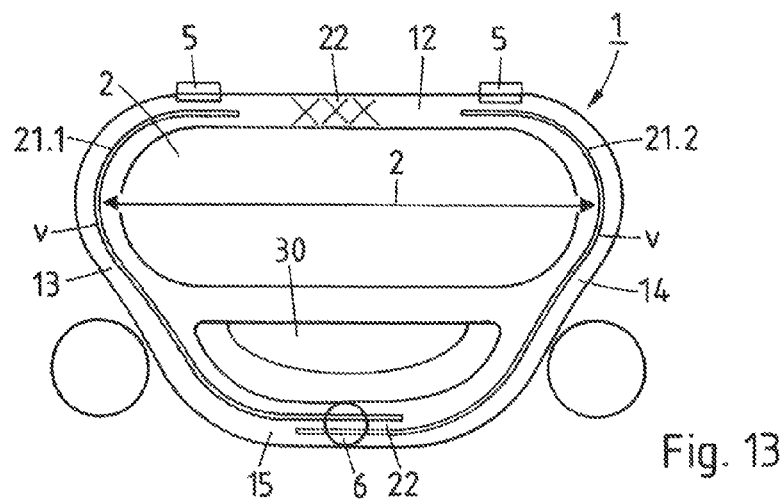
FIG. 13 a further example of a tailgate with a greatly rounded frame and with two continuous-fibre bands.

FIG. 13 also shows a further variant of a tailgate 1 with greatly bent longitudinal beams 13, 14 which at the bottom merge into a rounded transverse beam 15. The rear window 2 here is bent around in the direction of the C-column. The continuous-fibre reinforcement consists of only two vertical continuous fibre bands 21.1 and 21.2 which, beginning at the hinges 5, extend through the longitudinal beam into the transverse beam 15 and there overlap and are non-positively connected (22). A plastic rear spoiler 30 here can for example be attached below the window 2.

The following reference numerals have been used in the framework of this description:
1 tailgate, rear door
2 rear window
3 chassis
5 hinges
6 lock
7 wiper motor
8 spring damping elements
10 main carrying structure
11 peripheral frame
12 upper transverse beam
13, 14 lateral longitudinal beams
15, 16 lower transverse beams
17 corners of 11
20 fibre-reinforced moulding compound
21 continuous-fibre bands, continuous-fibre profiles
22 connection regions between 21
24 bead, trough
25 ribbing
26 cross-like or diagonal arrangement
27 plastic outer covering, outer layer
28 inserts, holder
29 inner covering, inner trim
30 rear spoiler
31 additional components
32 openings in 10
33 regions with 24, 25
34 load accommodation locations
35 viewed surface
H outer surface of the tailgate, tangential plane to H
v vertical to H, in a vertical direction to H
h horizontal alignment
d vertical distance to H

The invention claimed is:

1. A tailgate (1) or rear door for a motor vehicle, comprising:
a carrying structure of fibre-reinforced thermoplastic plastic, with hinges (5), a lock (6) and a rear window (2),
wherein the carrying structure includes a single-piece main carrying structure (10) with a peripheral, flexurally resistant frame (11) which comprises an upper transverse beam (12), two lateral longitudinal beams (13, 14) and at least one lower transverse beam (15),
wherein the main carrying structure includes a fibre-reinforced moulding compound (20) with at least two impregnated, integrated continuous-fibre bands (21), and is non-positively connected to the rear window (2) and together with the rear window forms a flexurally resistant structure,
wherein the continuous-fibre bands (21) in sections are integrated into the frame (11) and have an arrangement vertical (v) to the surface (H) of the tailgate,
by way of the continuous-fibre bands (21) being arranged vertically to the surface (H) and/or at a vertical distance (d) to the surface (H)
and wherein the continuous-fibre bands are connected to one another by way of spatial shapings of the fibre-reinforced moulding compound (20) as force-transmitting and stiffening connection regions (22)
and the frame (11) comprises bead-like (24) stiffenings of the moulding compound (20).

2. A tailgate according to claim 1, wherein the main carrying structure (10), in the frame (11) and within the frame comprises regions (33) with bead-like (24) and rib-like (25) stiffenings.

3. A tailgate according to claim 1, wherein the continuous-fibre bands (21) extend up to load accommodation locations (34).

4. A tailgate according to claim 1, further comprising an additional bead-like transverse beam (16) on the lower edge of the rear window (2).

5. A tailgate according to claim 1, wherein the continuous-fibre bands (21) are arranged vertically (v) to the surface (H), in the longitudinal beams (13, 14).

6. A tailgate according to claim 1, wherein parts of the frame (11) comprise a vertical (v) and a horizontal (h) continuous-fibre band.

7. A tailgate according to claim 1, wherein parts of the frame (11) comprise an upper and a lower horizontal (h) continuous-fibre band (21).

8. A tailgate according to claim 1, further comprising a diagonal or cross-like arrangement (26) of continuous-fibre bands (21) below the rear window.

9. A tailgate according to claim 1, wherein the transverse beams and/or longitudinal beams are designed as a trough or bead (24) with a diagonal ribbing (25).

10. A tailgate according to claim 1, wherein viewed surfaces (35, H) of the main carrying structure (10) are formed by the fibre-reinforced moulding compound (20) or by an outer covering (27).

11. A tailgate according to claim 1, further comprising a plastic outer covering (27) connected to the main carrying structure (10), outside the rear window.

12. A tailgate according to claim 1, further comprising a plastic rear spoiler (30) which is fixed or bonded on the main carrying structure (10).

13. A tailgate according to claim 1, further comprising inserts (28) as load accommodation locations (34) which as fastenings for the lock (6), the hinges (5), a wiper motor (7) or for spring damping elements (8), are integrated into the main carrying structure (10).

14. A tailgate according to claim 1, wherein the main carrying structure (10) is manufactured with an extrusion pressing method or with an injection moulding method, with shape-stabilised, impregnated continuous-fibre bands (21) which are inserted into a tool mould.

15. A tailgate according to claim 1, wherein the main carrying structure (10) in a part region comprises an additional, non-positively connected inner covering (29).

\* \* \* \* \*